(12) United States Patent
Mitchell

(10) Patent No.: US 7,108,383 B1
(45) Date of Patent: Sep. 19, 2006

(54) OPTICAL SYSTEM WITH REFLECTION-ANGLE-SELECTIVE MIRROR

(75) Inventor: Daniel Bruce Mitchell, Port McNicoll (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/093,822

(22) Filed: Mar. 29, 2005

Related U.S. Application Data

(63) Continuation-in-part of application No. 10/831,078, filed on Apr. 22, 2004, now Pat. No. 6,992,830.

(51) Int. Cl.
G02B 5/08 (2006.01)
G02B 1/10 (2006.01)
G02B 5/28 (2006.01)
G02B 27/00 (2006.01)

(52) U.S. Cl. ............... 359/839; 359/584; 359/589; 359/359; 359/613

(58) Field of Classification Search ......... 359/577, 359/584, 586–589, 839, 884, 359, 597, 601, 359/602, 613, 629, 634
See application file for complete search history.

(56) References Cited

U.S. PATENT DOCUMENTS

| | | | |
|---|---|---|---|
| 4,745,416 A | 5/1988 | Horihata | |
| 4,969,730 A | 11/1990 | van den Brandt | |
| 5,193,028 A | 3/1993 | Noguchi | |
| 5,452,024 A | 9/1995 | Sampsel | |
| 6,014,845 A | 1/2000 | Jain et al. | |
| 6,023,365 A | 2/2000 | McDonald | |
| 6,078,421 A | 6/2000 | Davey et al. | |
| 6,157,486 A * | 12/2000 | Benson, Jr. et al. | 359/498 |
| 6,609,798 B1 | 8/2003 | Milinusic et al. | |
| 6,630,283 B1 * | 10/2003 | Simpson et al. | 430/271.1 |
| 6,697,195 B1 * | 2/2004 | Weber et al. | 359/359 |
| 6,992,830 B1 * | 1/2006 | Mitchell et al. | 359/618 |

* cited by examiner

Primary Examiner—Loha Ben
Assistant Examiner—Jack Dinh
(74) Attorney, Agent, or Firm—William C. Schubert; Karl A. Vick

(57) ABSTRACT

An optical system includes a reflection-angle-selective mirror having a substrate, and a reflection-angle-selective coating structure deposited on the substrate. The reflection-angle-selective coating structure has a higher reflectance for light that is incident upon the reflection-angle-selective coating structure at a first incidence angle within an acceptance-angle deviation from a design incidence angle than for light that is incident upon the reflection-angle-selective coating structure at a second incidence angle greater than the acceptance-angle deviation from the design incidence angle. The optical system may also include a light source.

8 Claims, 4 Drawing Sheets

OPTICAL SYSTEM WITH REFLECTION-ANGLE-SELECTIVE MIRROR

This application is a continuation-in-part of application Ser. No. 10/831,078, filed Apr. 22, 2004, now U.S. Pat. No. 6,992,830, for which priority is claimed and whose disclosure is incorporated by reference.

This invention relates to an optical system and, more particularly, to an optical system having a mirror which reflects light at a selected angle or range of angles but not at other angles.

BACKGROUND OF THE INVENTION

Many optical systems contain powered or unpowered mirrors. A mirror reflects a primary beam of incident light at an angle equal to the angle of incidence. In the ideal case where there is a single perfectly collimated incident primary beam, the reflected beam contains only light from that incident primary beam. However, in many cases there are stray light rays reflected from the mirror at other angles. The stray light rays may result from a lack of perfect collimation of the incident primary beam, reflections from surfaces within the optical system such as lens coatings or supports, or from other light sources. Where the primary beam is in the infrared, the stray light may result from the radiation of the internal structure of the optical system.

The stray light rays may have several adverse effects. When they reach a detector, the stray light rays reduce the signal-to-noise ratio of the optical system by increasing the background signal or noise. The signal resolution of the optical system may be compromised. There also may be damage to sensitive optical components that are not designed for compatibility with the stray light.

The usual approach to avoiding stray light effects is the use of mechanical masks such as apertures, stops, and/or light baffles. These mechanical devices are positioned along the incident or reflected primary light paths to block the stray light rays. The mechanical masks are effective, but they lead to an increase in the size of the optical system because they are spaced apart from the mirror. The mechanical masks are therefore one of the impediments in attempts to miniaturize optical systems. Additionally, the mechanical masks limit the size of the useful area of the mirror. The smaller the opening of the mechanical mask through which the incident beam or reflected beam passes, the less area of the mirror is available for use and the less is its light-handling capacity.

There is a need for an improved approach to avoiding stray-light effects in optical systems that employ mirrors. The present invention fulfills this need, and further provides related advantages.

SUMMARY OF THE INVENTION

The present invention controls the stray light in an optical system by altering the properties of a mirror to reflect at only a single selected angle of incidence or a selected range of angles of incidence. Stray light at other angles is not reflected, and is either absorbed in the reflection-angle-selective mirror or passed through the reflection-angle-selective mirror. The stray light does not reach the detector or other structure to which the primary beam is reflected. The present approach is compact, because it requires only the application of a thin coating structure to the mirror substrate and does not require the use of mechanical masks. The present approach allows the entire reflection-angle-selective mirror surface to be utilized in reflecting the primary beam, and also allows the use of larger mirrors than previously possible.

In accordance with the invention, an optical system comprises a reflection-angle-selective mirror. The reflection-angle-selective mirror includes a substrate and a reflection-angle-selective coating structure deposited on the substrate. The reflection-angle-selective coating structure has a higher reflectance for light that is incident upon the reflection-angle-selective coating structure at a first incidence angle within an acceptance-angle deviation from a design incidence angle than for light that is incident upon the reflection-angle-selective coating structure at a second incidence angle greater than the acceptance-angle deviation from the design incidence angle. The optical system may include a light source, such as a laser light source, that directs a beam of light that is incident upon the reflection-angle-selective mirror at a source incidence angle within the acceptance-angle deviation from the design incidence angle. The optical system may also include other optical components such as refractive optical components and other reflection-angle-selective or conventional mirrors, each in a cooperative optical relationship with the reflection-angle-selective mirror.

The reflection-angle-selective coating structure preferably comprises a plurality of layers of at least two different materials. Typically, at least some of the layers are of differing thicknesses. In the usual case, the reflection-angle-selective coating structure comprises a plurality of alternating layers of at least two different materials.

If the substrate is transparent, the light that is not reflected may pass through the substrate. The substrate may also be selected to absorb light that is incident upon the reflection-angle-selective coating structure at the second incidence angle greater than the acceptance-angle deviation from the design incidence angle.

Thus, the reflection-angle-selective mirror is reflective for the primary light beam incident at or near the design incidence angle, and does not reflect light incident at other angles greater than the acceptance-angle deviation. Stray light from any source incident at other angles is not reflected. The result is improved signal-to-noise ratio in the primary beam, and a reduced chance of damage of optical components due to stray or "off axis" light. The optical system is compact because the thin coating structure is applied to the surface of the substrate and no aperture or other type of separate mechanical mask is required.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
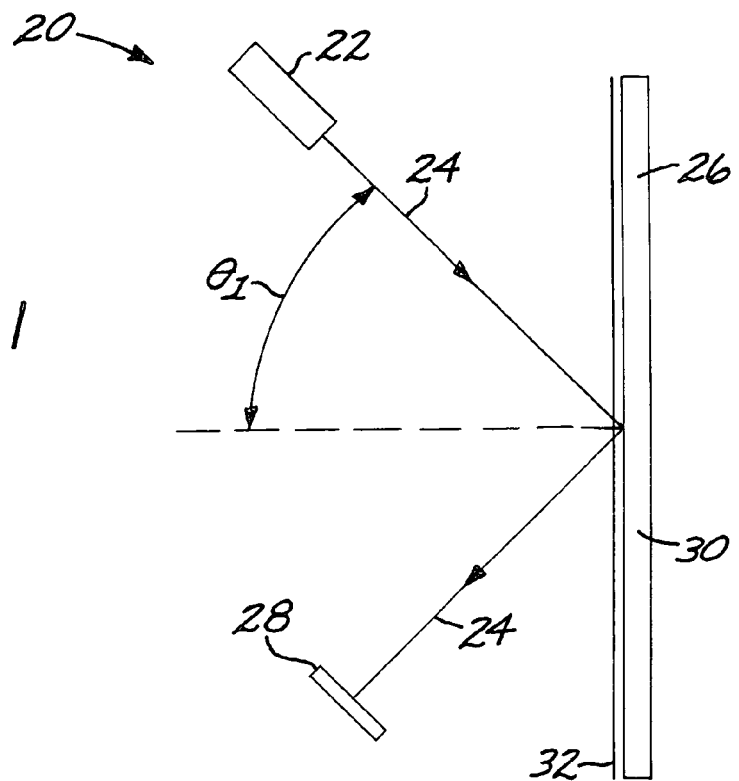
FIG. 1 is a schematic elevational view of an optical system.

FIG. 1 depicts an optical system 20 comprising a light source 22 having as an output a primary beam 24 of light. The light source 22 may be of any type, with a visible or infrared laser being an example. The output beam of the light source, which is the primary beam 24, is incident upon and reflects from a reflection-angle-selective mirror 26 to a detector 28. In practice, optical systems 20 usually have more and/or different optical elements in addition to the reflection-angle-selective mirror 26, but these illustrated optical elements are sufficient to present the basic features of the invention.

Figure 2:
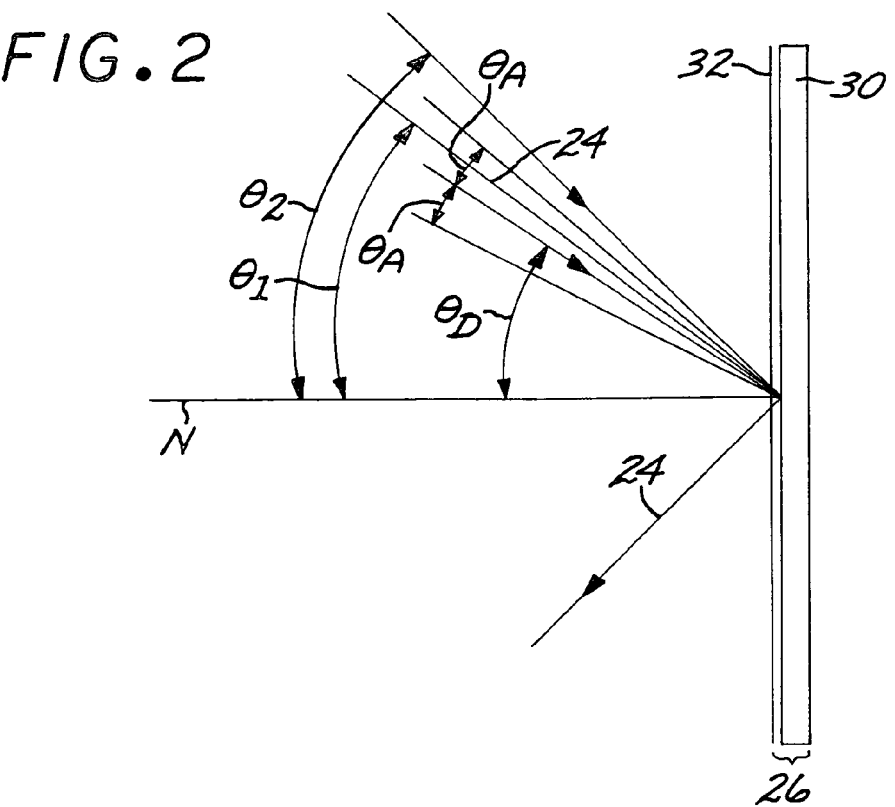
FIG. 2 is a schematic elevational view of the reflection-angle-selective mirror of FIG. 1, illustrating the angular relationships.

The reflection-angle-selective mirror 26 includes a substrate 30 and a reflection-angle-selective coating structure 32 deposited upon the substrate 30. FIG. 2 illustrates the angular performance of the reflection-angle-selective mirror 26. The reflection-angle-selective coating structure 32 has a higher reflectance for light that is incident upon the reflection-angle-selective coating structure 32 at a first incidence angle $\theta_1$ within an acceptance-angle deviation $\theta_A$ from a design incidence angle $\theta_D$ than for light that is incident upon the reflection-angle-selective coating structure 32 at a second incidence angle $\theta_2$ greater than the acceptance-angle deviation $\theta_A$ from the design incidence angle $\theta_D$. (All angles other than $\theta_A$ are measured from a line N that is locally perpendicular to the surface of the reflection-angle-selective mirror 26.)

The geometry of the optical system 20 is arranged such that the primary beam 24 is incident upon the reflection-angle-selective mirror 26 at angle $\theta_1$. The primary beam 24 is reflected from the reflection-angle-selective mirror 26 with little attenuation. Any light incident upon the reflection-angle-selective mirror 26 at an angle $\theta_2$, which may be termed stray light, is attenuated much more strongly, as will be demonstrated subsequently. The signal-to-noise ratio, as measured at the detector 28, of the primary beam relative to the stray light is therefore greater than if the reflection-angle-selective mirror 26 reflected the stray light at the angle $\theta_2$, as well as the primary beam 24 at the angle $\theta_1$.

Figure 3:
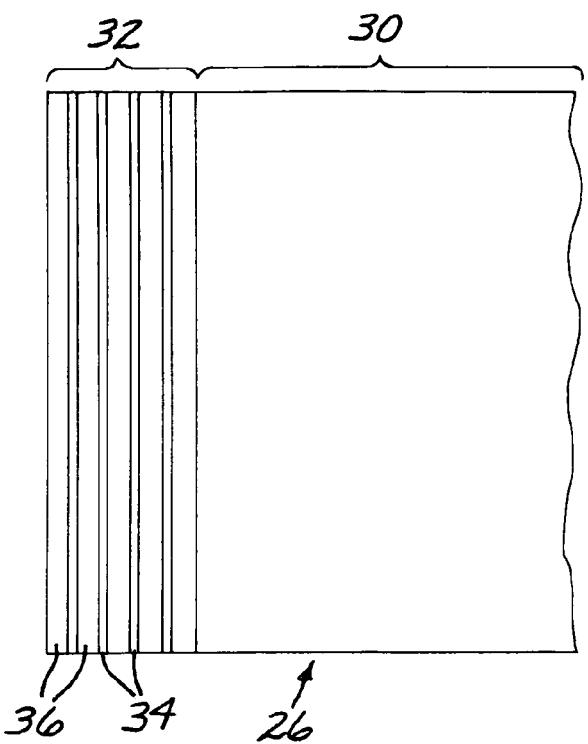
FIG. 3 is a schematic enlarged elevational view of the structure of the reflection-angle-selective mirror of FIG. 1.

As shown in FIG. 3, the reflection-angle-selective coating structure 32 preferably comprises a plurality of layers 34, 36 of at least two different materials that are each transparent to a selected wavelength of light of the primary beam, deposited upon the surface of the substrate 30. Typically, at least some of the layers 34, 36 are of differing thicknesses. In the illustrated embodiment, the reflection-angle-selective coating structure 32 has a plurality of alternating layers 34, 36 of at least two different transparent materials; that is, in sequence layer 34, layer 36, layer 34, layer 36, etc. There may be additional types of layer materials as well, such as a base non-transparent layer between the reflection-angle-selective coating structure 32 and the substrate 30. The layers 34 may be of the same or different thicknesses, and the layers 36 may be of the same or different thicknesses.

The stray light energy incident upon the substrate at the second incidence angle $\theta_2$, which is not reflected as strongly as the energy of the primary light beam at the first incidence angle $\theta_1$, may pass through the reflection-angle-selective mirror 26 if the substrate 30 and the reflection-angle-selective coating structure 32 are transparent to the stray light. Alternatively, the stray light energy may be absorbed by the reflection-angle-selective mirror 26 if the substrate 30 and the reflection-angle-selective coating structure 32 are sufficiently light absorbent.

Figure 4:
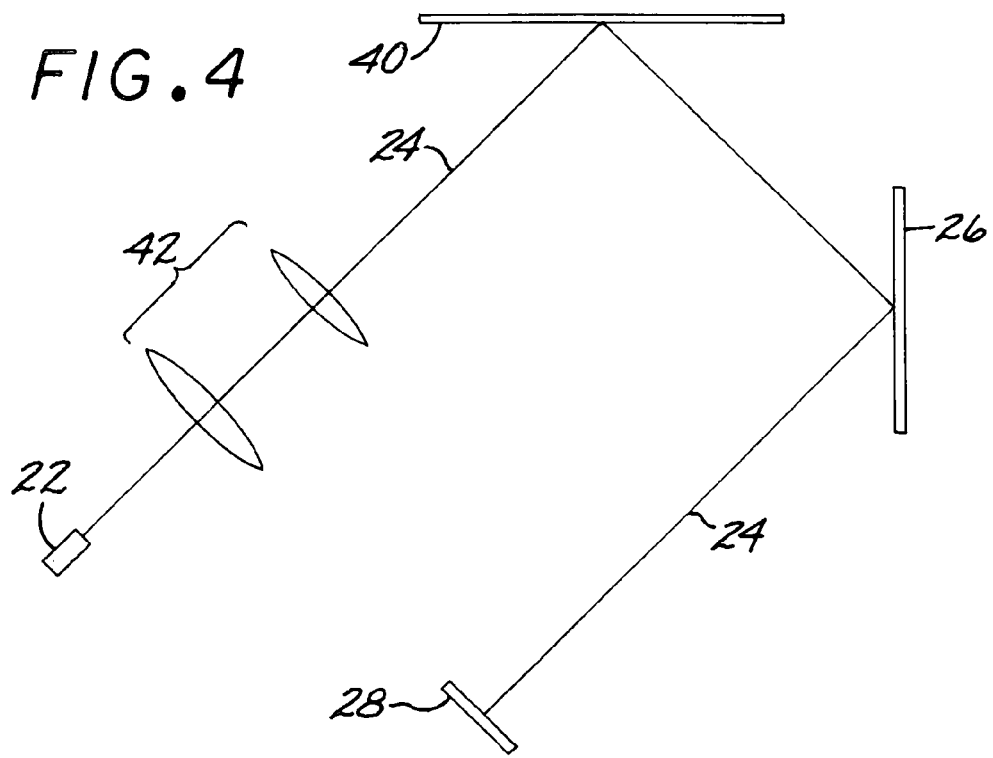
FIG. 4 is a schematic elevational view of a second embodiment of the optical system.

FIG. 4 illustrates a second embodiment of the optical system 20. Optical components common with the embodiment illustrated in FIG. 1 are assigned the same reference numerals, and the discussion is incorporated as to those optical components. In the embodiment of FIG. 4, additional optical components are added to illustrate their compatibility with the present approach. One or more additional mirrors 40 are present. The additional mirrors 40 may be reflection-angle-selective mirrors like the reflection-angle-selective mirror 26, or they may be conventional mirrors such as conventional silvered mirrors that are not reflection-angle selective. It is preferred that the last mirror which the primary beam 24 reflects from prior to reaching the detector 28 be reflection-angle selective, to eliminate any stray light beams that have developed prior to that point of the optical system 20. One or more refractive optical components 42, illustrated as lenses, may also be present in the optical system 20. Additional optical components such as diffractive optical components may also be present. The reflective and refractive optical components 26, and 40 and/or 42, are in a cooperative optical relation with each other, meaning that they are positioned so that the primary beam 24 encounters each of these optical components as it travels along its path from the light source 22 to the detector 28.

The reflection-angle-selective coating structure 32 is custom designed for each application. Design programs that are normally used to design wavelength-selective coatings may be adapted and modified for use in designing reflection-angle-selective coating structures 32. Such programs used to design wavelength-selective coatings are readily available and widely used, and for example include the commercially available Filmstar[R], FilmWizard, and TF Calc programs.

Generally, these programs work by optimizing layer thicknesses to give a best possible match to a design target. The target, in this case, is a set of reflections versus angle for a particular wavelength range (or for a single wavelength). To design a reflection-angle-selective mirror, the reflection target is typically set to 100 percent for points in the high-reflection region, and typically to 0 percent for the low-reflection region. (The high and low limits may be set to other values, such as 90 percent for points in the high-reflection region and 10 percent for the low-reflection region.) The materials to be used are selected by the designer, from those compatible with the available coating material and with the wavelength range being reflected. The initial number of layers is also selected by the designer. The materials and processes used necessitate the setting of some limits on the layer thicknesses. For example, $MgF_2$ generally has a sufficiently high internal stress to limit the layer thickness to well under 1 micrometer. For some deposition equipment, it is not possible to accurately produce very thin layers. Most deposition equipment also has an upper limit on the total thickness of material that may be deposited (because of the limit on the amount of coating material that may be loaded into the deposition system). A design with too many layers, hundreds of layers for example, is typically not practical because it is not practical to deposit that many layers without some errors. The designer must include all of the relevant limits and considerations in setting up the design program, or designs may result that are physically impossible to implement. When the design program is started, it calculates the deviation from the target (for example, the root mean square difference). It then alters one or more layer thicknesses to reduce the deviation. The alterations are selected using an optimization technique, such as Simplex or Levenberg-Marquardt. The deviation is calculated again, and the layers adjusted again, repeating until the program has converged on a solution. The solution is sometimes not the best solution, but simply a local minimum. That is determined, in part, by the starting conditions selected by the designer. If the result is not satisfactory, the materials, number of layers, and/or starting conditions are changed, and the optimization is re-started.

The deposition of the reflection-angle-selective coating structure 32 on the substrate 30 is accomplished by any appropriate deposition technique, with examples being chemical vapor deposition (CVD), physical vapor deposition (PVD), or sputtering.

Reflection-angle-selective mirrors 26 have been designed using the approach described above, and FIGS. 5 and 6 illustrate the theoretical performance of two such cases.

Figure 5:
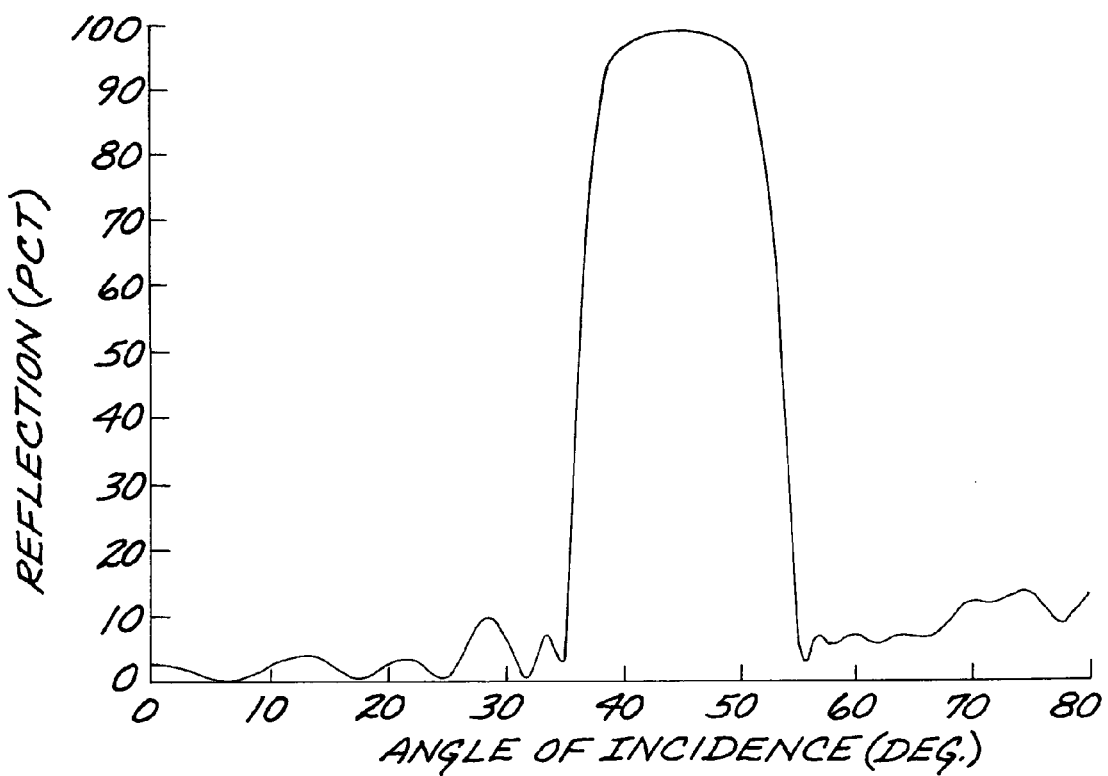
FIG. 5 is a graph of reflection as a function of angle for a reflection-angle-selective mirror designed to reflect a first primary beam.

In the first case, the reflection-angle-selective mirror 26 was designed to reflect laser light at 1064 nanometers with a design incidence angle $\theta_D$ of 45 degrees and an acceptance-angle deviation $\theta_A$ of +/−5 degrees. The reflection-angle-selective coating structure 32 had a total of 42 layers, with the layers 34, 36 alternating between layers of $SiO_2$, each of whose thicknesses lies in the range of 116–648 nanometers and layers of $TiO_2$, each of whose thicknesses lies in the range of 114–382 nanometers. FIG. 5 illustrates the calculated performance of the reflection-angle-selective mirror 26 and shows that the reflection is greater than 96 percent for angles of incidence of 40–50 degrees, and falls rapidly at smaller and greater angles of incidence.

Figure 6:
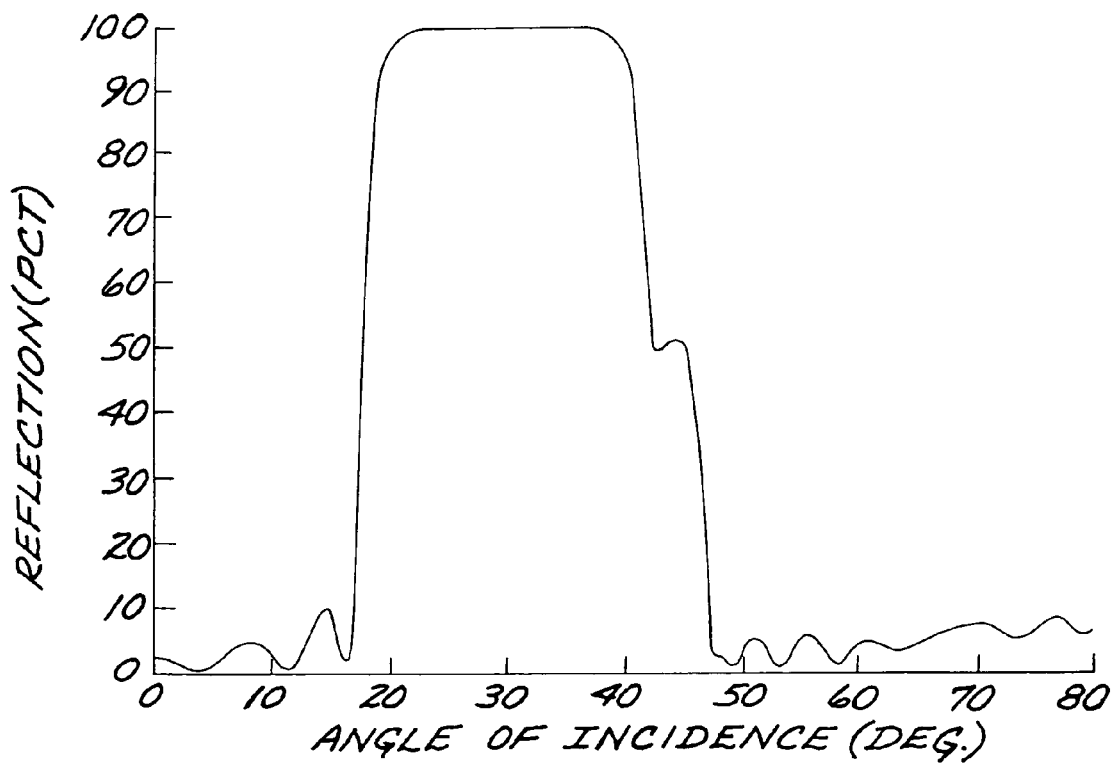
FIG. 6 is a graph of reflection as a function of angle for a reflection-angle-selective mirror designed to reflect a second primary beam.

In the second case, the reflection-angle-selective mirror 26 was designed to reflect laser light at 1542 nanometers with a design incidence angle $\theta_D$ of 30 degrees and an acceptance-angle deviation $\theta_A$ of +/−10 degrees. The reflection-angle-selective coating structure 32 had a total of 58 layers, with the layers 34, 36 alternating between layers of $MgF_2$, each of whose thicknesses lies in the range of 192–660 nanometers and layers of $Ta_2O_5$, each of whose thicknesses lies in the range of 5–194 nanometers. FIG. 6 illustrates the calculated performance of the reflection-angle-selective mirror 26 and shows that the reflection is greater than 95 percent for angles of incidence of 20–40 degrees, and falls rapidly at smaller and greater angles of incidence.

In each case, the reflectance of the light at the second incidence angle (i.e., stray light) either greater or smaller than the acceptance-angle deviation is not zero. Some stray light does reflect from the reflection-angle-selective mirror 26, but it is typically less than 5 percent of the incident magnitude at significant deviations from the design incidence angle. The sharpness of the dividing line between the reflected light and the non-reflected light may be increased by adding additional layers 34, 36. However, the added layers 34, 36 also unacceptably increase the production complexity and cost, and reduce the manufacturing yields, of the reflection-angle-selective mirror 26, and therefore in many cases a moderate degree of light reflection for higher and lower angles is acceptable. Another approach is to use two or more reflection-angle-selective mirrors 26 along the path of the primary beam 24. Each of the reflection-angle-selective mirrors 26 reduces the stray light according to the approach just discussed, leading to a geometric reduction in the stray light reaching the detector 28.

Figure 7:
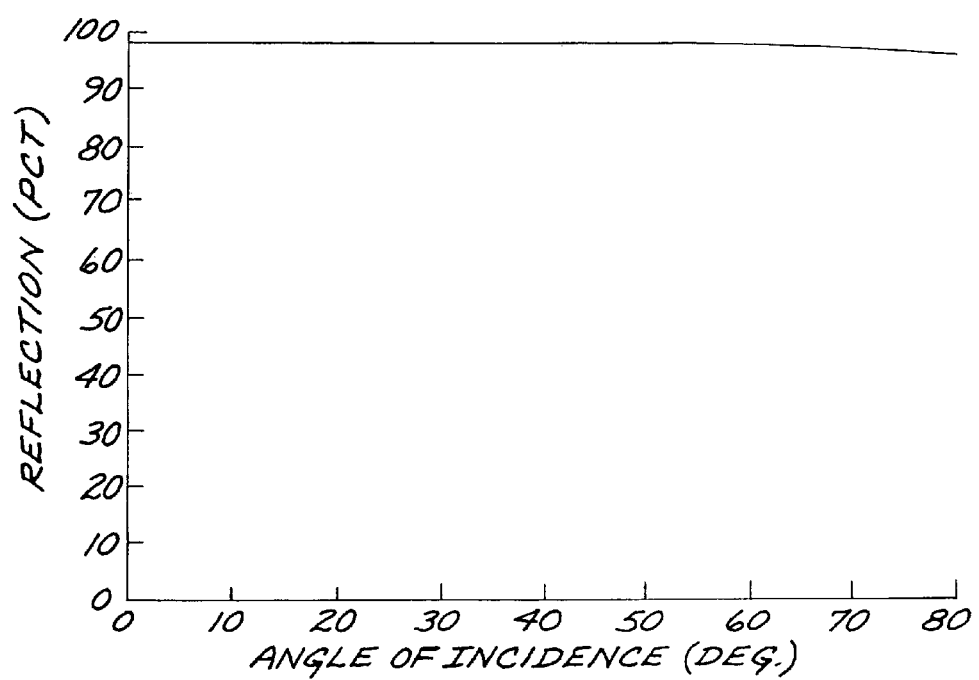
FIG. 7 is a graph of reflection as a function of angle for a conventionally silvered mirror.

For comparison, FIG. 7 depicts the reflection performance of a conventionally silvered mirror. The reflection is nearly independent of the angle of incidence and is nearly 100 percent for all angles of incidence.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system comprising a reflection-angle-selective mirror, wherein the reflection-angle-selective mirror includes:
   a substrate; and
   a reflection-angle-selective coating structure deposited on the substrate, wherein the reflection-angle-selective coating structure has a higher reflectance for light that is incident upon the reflection-angle-selective coating structure at a first incidence angle within an acceptance-angle deviation from a design incidence angle than for light that is incident upon the reflection-angle-selective coating structure at a second incidence angle greater than the acceptance-angle deviation from the design incidence angle, wherein the reflection-angle-selective coating structure comprises a plurality of alternating layers of at least two different materials that are each transparent to a selected wavelength of light.

2. The optical system of claim 1, wherein at least some of the layers are of differing thicknesses.

3. The optical system of claim 1, wherein the substrate is transparent to the selected wavelength of light.

4. The optical system of claim 1, wherein the substrate absorbs light that is incident upon the reflection-angle-selective coating structure at the second incidence angle greater than the acceptance-angle deviation from the design incidence angle.

5. The optical system of claim 1, further including
   a light source that directs a primary beam of light that is incident upon the reflection-angle-selective mirror at a source incidence angle within the acceptance-angle deviation from the design incidence angle.

6. The optical system of claim 1, further including
   a laser light source that directs a primary beam of light that is incident upon the reflection-angle-selective mirror at a source incidence angle within the acceptance-angle deviation from the design incidence angle.

7. The optical system of claim 1, further including
   at least one additional mirror in a cooperative optical relationship with the reflection-angle-selective mirror.

8. The optical system of claim 1, further including
   at least one refractive optical component in a cooperative optical relationship with the reflection-angle-selective mirror.

* * * * *